United States Patent [19]

Uchino et al.

[11] Patent Number: 4,476,354

[45] Date of Patent: Oct. 9, 1984

[54] TELEPHONE DEVICE

[75] Inventors: Yasuhito Uchino; Hisashi Miyajima, both of Tokyo, Japan

[73] Assignee: Tokyo Shibaura Denki Kabushiki Kaisha, Japan

[21] Appl. No.: 406,914

[22] Filed: Aug. 10, 1982

[30] Foreign Application Priority Data

Aug. 13, 1981 [JP] Japan .................. 56-127159
Aug. 13, 1981 [JP] Japan .................. 56-120368

[51] Int. Cl.³ .................................. H04M 1/06
[52] U.S. Cl. .................................. 179/189 R
[58] Field of Search ............ 179/189 R, 178, 179, 179/184, 100 C, 2 EA, 146 R, 159; 455/89, 90, 99, 351

[56] References Cited

U.S. PATENT DOCUMENTS 3,889,071 6/1975 Davis .................. 179/146 R

FOREIGN PATENT DOCUMENTS 1262722 3/1961 France .................. 179/146 R 56-99957 8/1981 Japan .
1400788 7/1975 United Kingdom .......... 179/146 R Primary Examiner—Gene Z. Rubinson
Assistant Examiner—L. C. Schroeder
Attorney, Agent, or Firm—Cushman, Darby & Cushman

[57] ABSTRACT

A telephone device comprises a transmitter-receiver having transmitter and receiver sections and to be mounted on a telephone body by setting these transmitter and receiver sections into a setting recess formed in the telephone body, a locking lever arranged in the telephone body to project into the setting recess and engaged with an engaged recess formed in one end face of the transmitter section to prevent the transmitter-receiver from coming out of the setting recess and to urge the transmitter section through the engaged recess in one direction, a lifting lever to urge the transmitter section in a direction in which it comes out of the setting recess. The telephone body has a wall face contacted with the other end face of the transmitter section, so that transmitter section is sandwiched and held between the wall face and locking lever.

3 Claims, 6 Drawing Figures

TELEPHONE DEVICE

BACKGROUND OF THE INVENTION

The present invention relates to a telephone device particularly suitable for use in a car.

It is well known that this car telephone device has a locking mechanism for stably fixing the transmitter-receiver to the telephone body at the time of car running. The conventional locking mechanism is intended to fix and hold the transmitter-receiver by engaging the claw of a spring-urged lock lever with a recess of the transmitter-receiver and to release it by disengaging the claw of the lock lever from the recess by manually operating a release lever. When the transmitter-receiver is to be lifted, therefore, it becomes necessary to lift the transmitter-receiver while operating the release lever, that is, to lift the transmitter-receiver by one hand while operating the release lever by the other hand, for example.

From the viewpoint of making it small-sized, the telephone device of this kind usually employs a single unit of the locking mechanism to fix and hold only either the transmitting or receiving side of the transmitter-receiver. When the telephone device is subjected to vibration, therefore, the transmitter-receiver is sometimes forced to disengage from the telephone body, vibrating up and down and rotating around the claw of the lock lever. In order to overcome this problem, a projection is usually projected from the telephone body to contact the upper surface of the transmitter-receiver. However, this projection needs a troublesome operation of inserting one side of the transmitter-receiver under the projection and then mounting the other side thereof on the telephone body, when the transmitter-receiver is to be mounted on the telephone body. In addition, reverse operation is also needed when the transmitter-receiver is to be disengaged from the telephone body, and there is a fear that the projection is broken by the transmitter-receiver if the latter is directly lifted without being disengaged from under the former. The use of projection is extremely inconvenient particularly in the case of telephone device which often forces persons to lift the transmitter-receiver in a hurry.

SUMMARY OF THE INVENTION

The object of the present invention is to provide a telephone device simple in construction, allowing a transmitter-receiver to be easily mounted on and released from a telephone body, and capable of reliably fixing and holding the transmitter-receiver to the telephone body.

According to an aspect of the present invention, a telephone device comprises a telephone body having a surface provided with a setting recess, a transmitter-receiver having a transmitter section and a receiver section and to be mounted on the telephone body by setting these transmitter and receiver sections into the setting recess, the transmitter-receiver having an engaged portion formed on one side thereof, a locking mechanism arranged in the telephone body to project into the setting recess and engaged with the engaged portion of the transmitter-receiver set in the setting recess to prevent the transmitter-receiver from coming out of the setting recess and to urge the transmitter-receiver through the engaged portion in one direction, a lifting mechanism arranged to project into the setting recess and to which an urging force is charged by the transmitter-receiver, when set in the setting recess, to urge the transmitter-receiver in a direction in which the transmitter-receiver comes out of the setting recess, and a holding member arranged in the telephone body and combined with the locking mechanism to prevent the transmitter-receiver from moving in a direction and floating from the telephone body.

The telephone device having such arrangement as described above enables the transmitter-receiver to be easily mounted on and released from the telephone body and prevents the transmitter-receiver from becoming unsteady, when locked, without using the float-prohibiting projection and the like.

BRIEF DESCRIPTION OF THE DRAWINGS

FIGS. 1 through 5 show an embodiment of a telephone device according to the present invention, in which FIG. 1 is a plan view showing the whole of telephone device, FIG. 2 is a side view showing the telephone device partly cut away, FIGS. 3 and 4 are perspective and plan views showing locking and lifting mechanisms, and FIG. 5 is a side view showing the telephone device left under operation different from that in FIG. 2.

DETAILED DESCRIPTION OF THE PREFERRED EMBODIMENT

An embodiment of a telephone device according to the present invention will be described referring to drawings attached.

Figure 1:
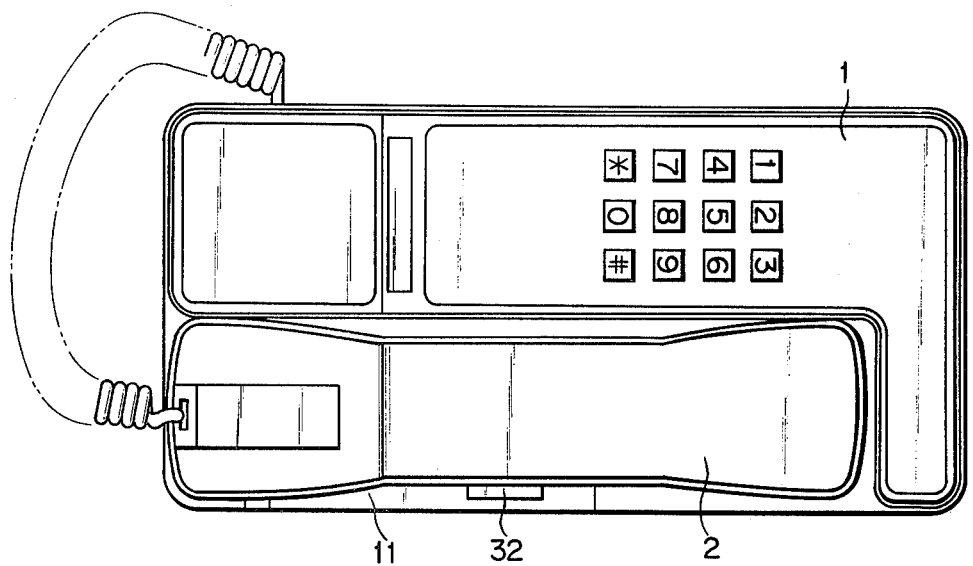
Figure 2:
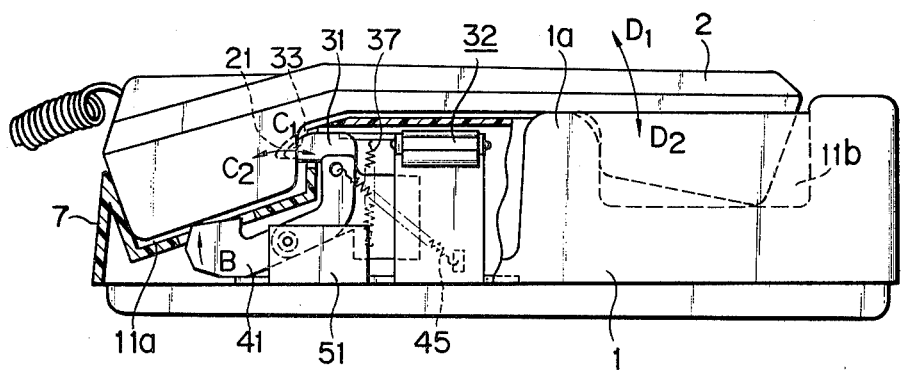

Reference numeral 1 represents a telephone body, on the upper surface of which are arranged push button dials. In the upper surface of body 1 is also formed a setting recess 11 extending along the longitudinal direction of the body 1. The setting recess 11 is divided by a projecting portion 1a of the body 1 to a transmitter receiving portion 11a and a receiver receiving portion 11b. A transmitter-receiver 2 is set in the recess 11 in such a way that its transmitter section is received in one receiving portion 11a while the receiver section in the other receiving portion 11b and that the intermediate section between transmitter and receiver sections is mounted on the projecting portion 1a, as shown in FIG. 2.

Inside the projecting portion 1a of the telephone body 1 are arranged a locking mechanism 3 for fixing and holding the transmitter-receiver 2 to the body 1 and a lifting mechanism 4 for lifting the transmitter-receiver upward, when the transmitter-receiver 2 is set in the predetermined position on the body 1.

Figure 3:
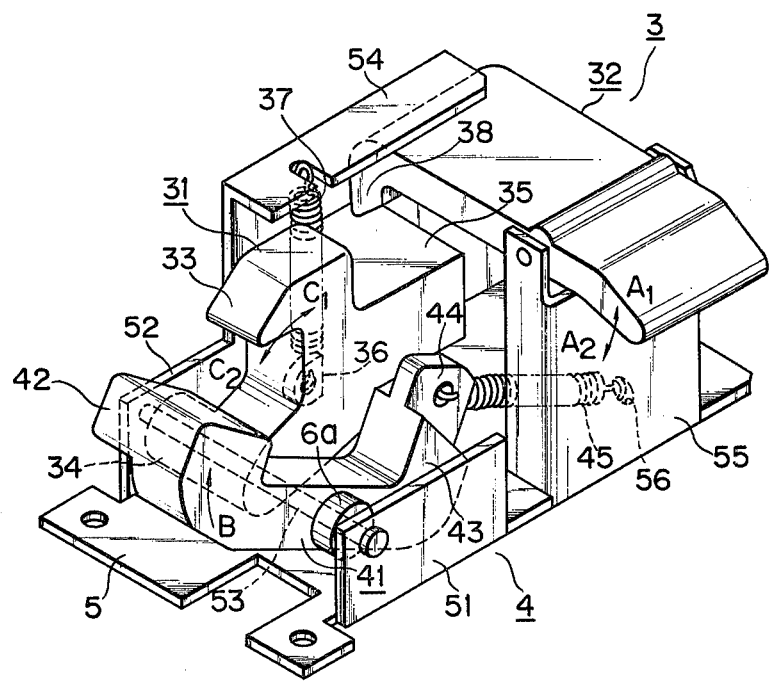
Figure 4:
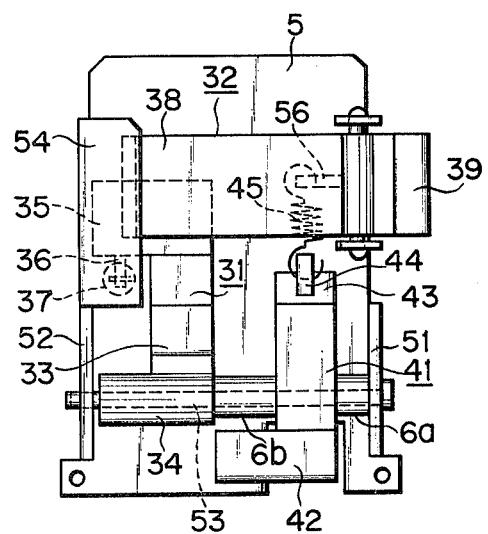

As shown in FIGS. 3 and 4, the locking mechanism 3 has a lock lever 31 and a release lever 32. The lock lever 31 has a claw 33 formed on one upper end thereof and capable of engaging with an engaged recess 21 (FIG. 2) formed in one end surface of the transmitter section of the transmitter-receiver 2. An attaching portion 34 is projected from one lower end portion of the lever 31 and an operating portion 35 is formed on the other upper portion thereof. The end of attaching portion 34 is attached to a horizontal shaft 53 whose both ends are rotatably supported by side plates 51 and 52 of a frame member 5, so that the lever 31 is allowed to freely rotate around the shaft 53 in directions $C_1$ and $C_2$. The bottom of an actuating end portion 38 projecting downward from one end of the release lever 32 is contacted with the upper surface of the operating portion 35. An overhang 54 is projected from the upper end of the side plate 52, positioning above one side of the lock lever 31 and one end of the release lever 32. A tension coil spring 37 is arranged between the overhang 54 and the lock lever 31, usually forcing the lock lever 31 to be rotated in the direction $C_2$. The other end of the release lever 32 extends downward and obliquely to form an actuating end portion 39. The lever 32 is supported by a plate 55 at side centers thereof and rotatable in directions $A_1$ and $A_2$ around a horizontal shaft substantially perpendicular to the one 53. Therefore, the lever 32 is usually forced by the lock lever 31 through the operating portion 35 and actuating end portion 38 to rotate in the direction $A_2$ and contacted with the bottom of overhang at one end thereof when it is substantially horizontal.

The lifting mechanism 4 has a lifting lever 41 projected upward at both ends thereof to form an actuating end portion 42 and an operating end portion 43. The horizontal shaft 53 loosely penetrates through the intermediate portion of lever 41, thus allowing the lever 41 to rotate therearound. A first spacer 6a is attached to the shaft 53 between the side plate 51 and the lifting lever 41, and a second spacer 6b between the lifting lever 41 and the lock lever 31, thus preventing the lifting lever 41 from moving in the axial direction. A projection 44 is projected from the upper surface of the actuating end portion 43 of the lifting lever 41 and a tension spring 45 is arranged between the projection 44 and a projection 56 formed on the lower portion of the plate 55. The lifting lever 41 is usually urged by the spring 45 to rotate in a direction B to keep the actuating end portion 42 in its upper position.

Figure 5:
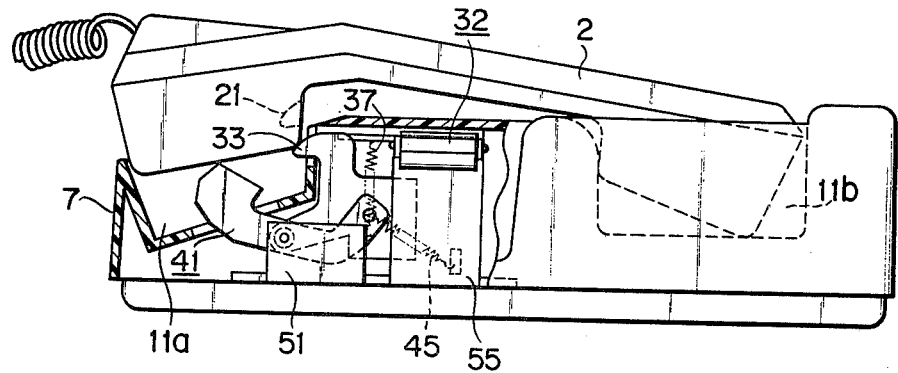

As shown in FIGS. 2 and 5, the claw 33 of the lock lever 31 is urged by the spring 37 to project into one receiving portion 11a through one end side thereof. The actuating end portion 42 of the lifting lever 41 is urged by the spring 45 to project into the receiving portion 11a through the base thereof, as shown in FIG. 5, and pushed by the transmitter section out of the receiving portion 11a when the transmitter section is received therein, as shown in FIG. 2.

The engaging recess 21 formed in one end face of the receiver section has a triangular section, with its roof curved and its floor horizontal. The claw 33 also has a triangular section, with its upper face sloped and its bottom horizontal. As the result, the transmitter section is limited in its upward movement and urged by the claw 33 toward the other end of the receiving portion 11a, that is, in a direction E in FIG. 2 when the claw 33 is engaged with the recess 21. The other end inner face 7 of the receiving portion 11a is sloped to substantially correspond to the end face of the transmitter section and cooperates with the claw 33 to hold the transmitter section therebetween, thus forming a holding member for preventing the transmitter-receiver from rotating and floating around the claw 33.

There will be described the operation of the telephone device having such arrangement as described above.

When the transmitter-receiver 2 is to be set on the telephone body 1, the transmitter-receiver 2 is put into the setting recess 11 and then forcedly pushed down. As the result, one end face of the transmitter section of the transmitter-receiver 2 is contacted with and slided on the slanted upper face of the claw 33 of the lock lever 31, thus causing the lock lever 31 to be retreated in the direction $C_1$ against the action of spring 37. The lifting lever 41 is also pushed by the bottom of the transmitter section of the same time and caused to rotate against the action of spring 45 in a direction reverse to the direction B. When the transmitter-receiver 2 is pushed down deeper than a predetermined extent, the recess 21 faces the claw 33 and the claw 33 is pushed into the recess 21 by the spring 37 to thereby achieve the engagement between the claw and the recess. As the result, the transmitter section is prevented from moving upward and rotating around the claw, as already described. This state of the transmitter-receiver 2 is shown in FIG. 2.

When the transmitter-receiver 2 is to be hooked off by lifting it, the operating end portion 39 of the release lever 32 is pulled upward (or in the direction $A_1$). This rotation of the release lever 32 causes its actuating end portion 38 to push down the operating end 35 of the lock lever 31, thus forcing the lever 31 to rotate in the direction $C_1$ against the action of the spring 37. As the result, the claw 33 is disengaged from the recess 21 to thereby release the engagement between them. The lifting lever 41 whose actuating end portion 42 has been contacted with the bottom of the transmitter section is thus rotated by the action of the spring 45 in the direction B to lift the transmitter section from the bottom of the receiving portion 11a, as shown in FIG. 5. When the transmitter-receiver 2 is then gripped and lifted by hand, voice-transmitting or -receiving operation can be made ready.

The transmitter-receiver 2 is kept floated from the bottom of the receiving portion 11a until it is lifted by hand, and not locked again even if the release lever 32 is left untouched. When the lock is once released, therefore, the transmitter-receiver 2 can be easily lifted by hand. Since the transmitter-receiver 2 is floated by the action of the lifting lever 41, it can be easily gripped by hand.

The functional effect of the holding member 7 will be described. Since the locking and lifting mechanisms 3 and 4 are arranged in relation to either the transmitter or receiver section of the transmitter-receiver 2 (transmitter section in this embodiment), the not-locked side of transmitter-receiver 2 (transmitter section in this embodiment) is easily made unsteady by vibration and impact. This can be prevented by increasing both the lifting force of the lifting lever 41 and the rotating force of the lock lever 31 around its claw 33 in a direction $D_1$ to forcedly press the receiver section of the transmitter-receiver 2 to the telephone body 1. When the lifting force of the lifting lever 41 is increased, however, the operating force of the release lever 32 may be needed to become larger, or the transmitter-receiver 2 may be popped up from the body 1 at the time of release. This is inconvenient and not preferable. Therefore, the holding member 7 is caused to cooperate with the lock lever 31 to prevent the transmitter-receiver 2 from being made unsteady. Namely, when vibration or impact is added to the transmitter-receiver 2, rotation moment in a direction $D_2$ is generated in the transmitter-receiver 2 corresponding to the lifting force of the lifting lever 41 and the receiver section of the transmitter-receiver 2 is urged by this moment to float from the body 1. This floating tendency is a cause for making the transmitter-receiver 2 unsteady. This embodiment of the telephone device enables the transmitter section to be sandwiched between the holding member 7 and the claw 33 of the lock lever 31, thus preventing the transmitter-receiver 2 from being floated at the transmitter section thereof.

Although the inner face of the transmitter receiving portion has been used as the holding member in the above-described embodiment, any of members may be employed if it can support from one side the transmitter-receiver, which is pressed from the other side by the lock lever, to prevent the one-directional movement of the transmitter-receiver when engaged with the recess of the lock lever.

Figure 6:
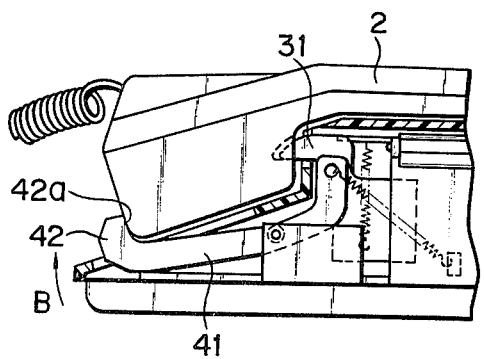
FIG. 6 is a sectional view showing a part of a modification of a telephone device according to the present invention.

As shown in FIG. 6, for example, it may be arranged so that the lifting lever 41 is made longer, that an engaging recess 42a is formed in the upper inner face of the actuating member 42 projected from the foremost end of the lifting lever to serve as the holding member, and that the other end lower corner of the transmitter section is engaged with the recess 42a. When the transmitter-receiver 2 is pushed down, the lifting lever is forced by the bottom of the transmitter-receiver 2 to rotate in a direction reverse to the direction B in this case and the actuating member 42 is disengaged from the bottom of the transmitter section at a predetermined position to thereby allow the transmitter section to be engaged as shown in FIG. 6. The transmitter section is thus sandwiched between the actuating member 42 and the lock lever 31 and prevented from floating from the telephone body 1.

Although it has been the transmitter section that is to be sandwiched between the holding member 7 and the lock lever in these embodiments of telephone device, the receiver section may be sandwiched. The inner end face of the projection 1a of the body 1 may be formed on the side of the receiver receiving portion 11 to serve as the holding member.

The lifting mechanism may be arranged to move the transmitter-receiver in the transverse direction as well as upward from the body 1 to keep the lock release.

Embodiments of the telephone device as described above are intended for use in cars but may be used as wall-hanging type in homes, because it is desirable in the case of the wall-hanging telephone device that the transmitter-receiver is locked on the telephone body.

The non-engaging portion including the engaging recess 21 may be formed as a projection projected from the end face.

What we claim is:

1. A telephone device comprising:
   a telephone body having a surface provided with a setting recess;
   a transmitter-receiver having a transmitter section and a receiver section and to be mounted on the telephone body by setting the transmitter and receiver sections into the setting recess, the transmitter-receiver having an engaged portion formed on one side thereof;
   a locking mechanism arranged in the telephone body to project into the setting recess and engaged with the engaged portion of the transmitter-receiver set in the setting recess to prevent the transmitter-receiver from coming out of the setting recess and to urge the transmitter-receiver through the engaged portion in one direction;
   a lifting mechanism arranged to project into the setting recess and to which an urging force is charged by the transmitter-receiver, when set in the setting recess, to urge the transmitter-receiver in a direction in which the transmitter-receiver comes out of the setting recess; and
   a holding member arranged in the telephone body and combined with the locking mechanism to prevent the transmitter-receiver from moving in a direction and floating from the telephone body, wherein
   said engaged portion is an engaged recess formed in one end face of one of said transmitter and receiver sections and said holding member is a wall face in contact with the other end face of the one of said transmitter and receiver sections, and the one of said transmitter and receiver sections is sandwiched between said wall face and said locking mechanism, and wherein
   said locking mechanism includes a rotatable lock lever having a claw at one end thereof to engage with the engaged recess, a spring for urging the lock lever in a direction in which its claw is engaged with the engaged recess, and means for rotating the lock lever in the reverse direction against the action of said spring.

2. A telephone device according to claim 1 wherein said lifting mechanism includes a rotatable lifting lever having an actuating member at one end thereof contacted with the transmitter-receiver to move the transmitter-receiver in a direction in which it comes out of the setting recess, and a spring for urging the lifting lever in a direction to move the transmitter-receiver in a direction in which it comes out of the setting recess.

3. A telephone device according to claim 2 further including a shaft by which said lock and lifting levers are supported coaxially rotatable.

* * * * *